Figure 1:
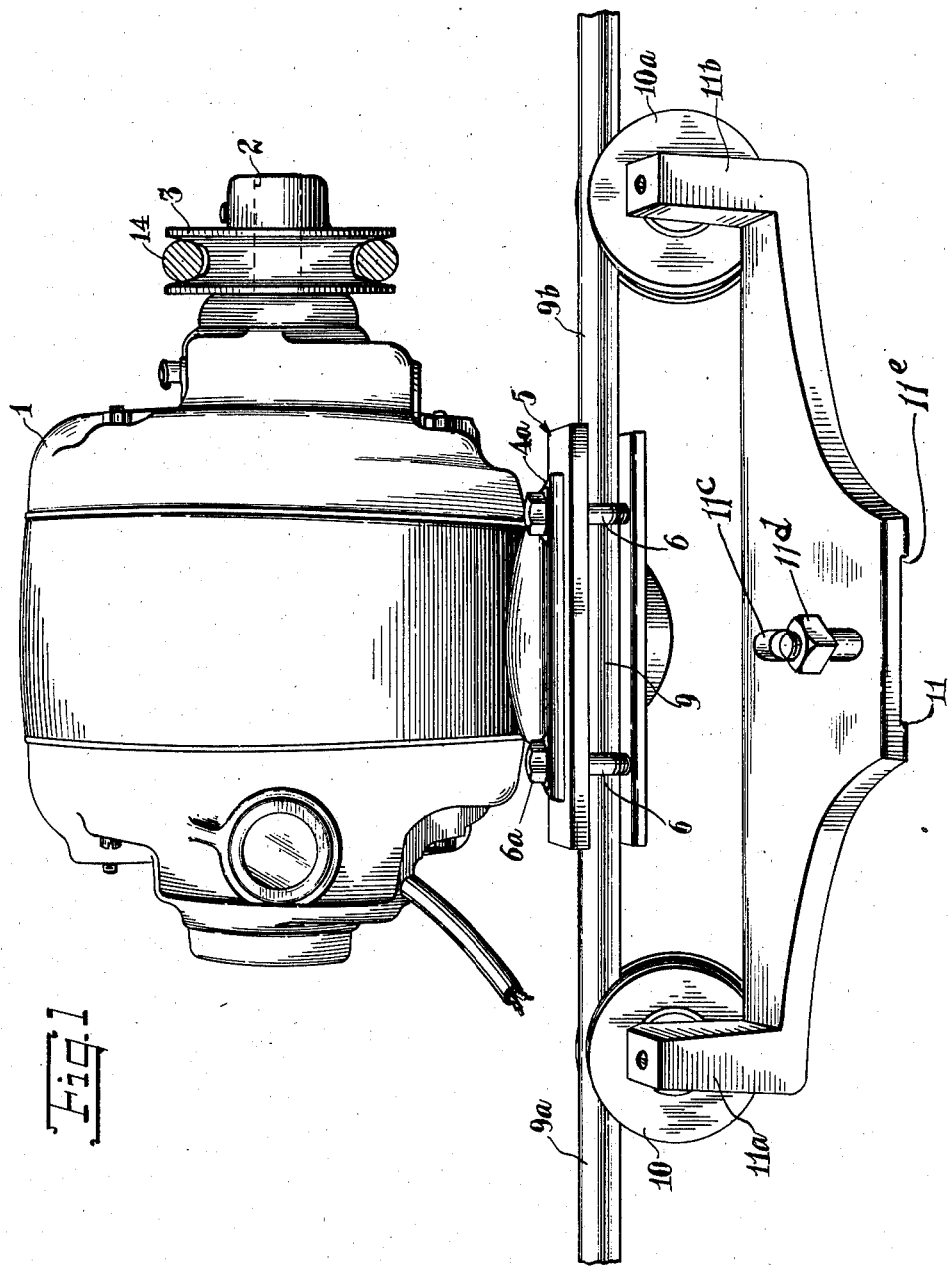

May 31, 1949.  A. POLLAK  2,471,773
FLOATING MOTOR MOUNT
Filed March 23, 1946  2 Sheets-Sheet 1

INVENTOR
Abraham Pollak
BY
Joseph F. O'Brien
ATTORNEY

May 31, 1949. A. POLLAK 2,471,773
FLOATING MOTOR MOUNT
Filed March 23, 1946 2 Sheets-Sheet 2
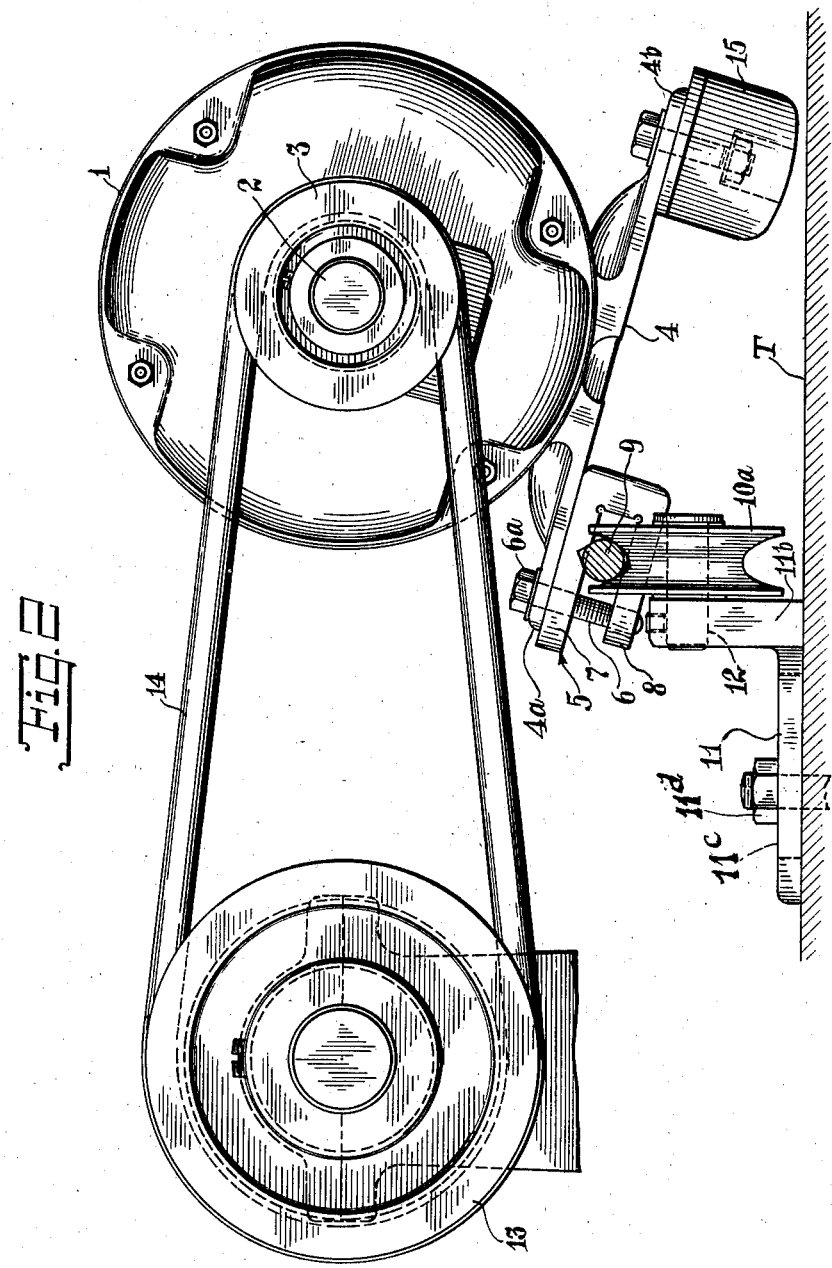
INVENTOR
Abraham Pollak
BY
Joseph F. O'Brien
ATTORNEY Patented May 31, 1949

2,471,773

UNITED STATES PATENT OFFICE 2,471,773

FLOATING MOTOR MOUNT

Abraham Pollak, Linfield, Pa.

Application March 23, 1946, Serial No. 656,730

5 Claims. (Cl. 74—242.13)

1

This invention relates to improvements in floating motor mounts.

Floating mountings for motors used for driving machine units have heretofore been mounted on carriages having wheels or pulleys rolling on fixed tracks to cause a movement of the motor along such tracks in a direction axially of or parallel to the motor shaft, and other motors have been mounted to tilt about stationarily mounted bars, but, so far as I am aware, no motor mounting device has embodied means which provide for both an axial movement and a transverse tilting movement of the motor, nor for axial movement of a tiltable motor-carrying rod or bar.

One of the objects of my invention is to provide a floating motor mount in which the motor is fixedly mounted on a motor-carrying bar or rod which is movable axially of or parallel to the motor shaft, and this axial movement of said motor-carrying bar or rod is preferably facilitated by anti-friction devices so as to permit facile movement of the motor in such axial or parallel direction.

Another object of this invention is to provide a construction of the type specified in which the anti-friction devices for the axially-movable motor-carrying bar or rod will also form bearings about which the mounting rod and motor may be tilted.

Still another object of my invention is to provide a highly simplified floating motor mount construction in which a roller-mounting base member is provided with spaced bearings having grooved rollers mounted therein, and a motor-carrying round rod is mounted in the grooves of said rollers so that the motor may have a floating axial movement parallel to the shaft thereof and also a tilting movement about the axis of the rod in the grooves of the anti-friction pulleys, which tilting movement will be in a direction substantially at a right angle to the said axial movement.

Still another object of my invention is to utilize a motor mount in which the motor is so tiltably mounted by its carrying bar in the grooves or slots of fixed pulleys as to cause the weight and the rotative reaction of the motor to maintain the driving belt between the driving pulley on the motor and the machine being driven in properly tightened condition at all times during a driving operation by the motor of another machine or driven unit.

Still another feature of my invention is to utilize in a floating motor mount of the type

2 specified a driving connection comprising a grooved pulley on the motor shaft, a grooved pulley on the shaft of the machine being driven and a drive-belt preferably having a round surface and placed under suitable tension between these shafts and pulleys by the reaction due to the tendency of the motor to rotate about its shaft plus the weight of the motor, and because of the facility of movement of the floating parts and said tension, axial movement of the motor to its proper position in relation to the machine being driven thereby may be accomplished automatically merely by the torque of said drive-belt which is applied to the drive pulley of the motor by a variation of the alignment of said driving and driven pulleys during the operation of the machine being driven by said motor.

With these and other objects in view, the invention comprises the combination of members and arrangement of parts so combined as to coact and cooperate with each other in the performance of the functions and the accomplishment of the results herein contemplated, and comprises in one of its adaptations the species or preferred form illustrated in the accompanying drawings, in which:

Fig. 1 is a view in side elevation of a motor mount and motor embodying my invention; and Fig. 2 is a view in end elevation of a motor mount shown in Fig. 1 having a belt connection with a suitable machine to be driven.

Referring now to these drawings which illustrate a preferred embodiment of my invention, I indicates a motor of any suitable design provided with a drive-shaft 2, having mounted thereon a driving pulley 3. The motor is provided with a conventional housing or casing and mounting base 4 having foot portions 4ª, 4ᵇ extending laterally to opposite sides of the shaft 2. One of said two laterally-extending foot portions 4ª is provided at one side of the shaft 2 with a suitable clamp 5 fixedly fastened to said foot portion 4ª of the base member 4 and having jaws 7 and 8 adapted, upon application of pressure, to close upon and to securely clamp therebetween a motor-carrying rod 9. As illustrated, the clamp is fixedly fastened to the foot 4ª of the base member 4, and clamping pressure is applied on the motor-carrying rod 9 by screw-bolts 6 which pass through the said foot portion and clamping jaws and are provided with heads 6ª for application of a wrench. The clamp 5 is sufficiently elongated to securely engage the motor-carrying rod 9 and to cause the motor to be fixedly and securely mounted thereon and by connection, as aforesaid, with said foot 4ª, said rod will extend along one side edge of the motor in a position parallel to the axis of the motor shaft 2, and will have portions which preferably extend in such axial or parallel direction beyond opposite ends of the motor shaft 2. In the embodiment illustrated, the clamp 5 is somewhat longer than the base member 4 and the rod 9 has extension ends 9ª, 9ᵇ projecting in opposite directions from the ends of said clamp.

By my invention, the motor-carrying rod 9 is supported by and mounted to move axially upon rotatable anti-friction devices and is thus movable in said axial direction parallel to the motor shaft. In the embodiment shown, such anti-friction devices comprise rollers suitably mounted and spaced from each other to provide for such movement of the rod 9 along the same, and for a consequent axial movement of the motor in relation to said rollers. As illustrated, the rollers 10—10ª are mounted in a roller-mounting bracket or base-member 11 provided with spaced bearing-blocks 11ª—11ᵇ having projecting from one side face thereof bearing pins 12 on which said spaced rollers 10, 10ª are mounted to rotate.

Also, in accordance with my invention, the motor-carrying rod 9 is round and the rollers are provided with grooves so that, in addition to the floating axial movement, the said rod may turn about its axis in said roller grooves which function as bearings therefor. The motor is thus mounted on said rod and said rod is supported to have a tilting movement about the axis thereof in a direction substantially at a right angle to the aforesaid axial movement.

The construction hereinabove described enables a highly facile axial movement, as aforesaid, and, because of the fact that the motor is fast upon the motor-carrying rod and said rod is supported to be movable axially or endwise on rotatable rollers 10, 10ª while being held in alignment, I am enabled to take full advantage of the rotative reaction of the motor to apply tension on a drive-belt 14 between the driving pulley 3 and a driven pulley 13 of the machine being driven by the motor. Also, the tilting movement hereinabove specified enables application of the weight of the motor through the driving pulley 3 on the motor to a similarly-grooved driven pulley 13 to apply tension between such pulleys by the drive-belt 14, which has a round surface and, because of the facility of movement of the floating parts and said tension, axial movement of the motor to its proper position in relation to the machine being driven thereby may be accomplished automatically merely by the torque of said drive-belt which is applied to the drive pulley of the motor by a variation of the alignment of said driving and driven pulleys during the operation of the machine being driven by said motor.

Also when a motor-carrying bar is disposed on the motor and mounted on pulleys, as aforesaid, a floating motor mount is produced in which both the weight of the motor and the rotative reaction thereof are fully applied to maintain the driving belt between the driving pulley on the motor and the machine being driven in properly tightened condition at all times during a driving operation by the motor of another machine or driven unit.

In the embodiment of my invention shown, the foot portion 4ª opposite to the mounting portion is provided with a contact or rest member 15 preferably composed of rubber or like material and so positioned in shape as to be slightly elevated from the supporting table T during the operation by the motor of a machine and adapted, upon excessive elongation, breaking or removal of the belt, to rest upon the supporting table T and to maintain the motor and its base member 4 in suitably tilted position.

It will be apparent from the above that I have provided a novel, extremely simple and low cost floating motor mount that will be applicable to drive varying types of machine units and to automatically move axially in accordance with the movement in parallel relationship of such machine unit or its driving parts, and that when a driving connection is provided between the motor and machine unit, such as a grooved pulley on the motor shaft, a similar grooved pulley on the machine being driven and a drive-belt, placed under suitable tension between such pulleys, the facility of movement of the motor, because of its floating mount and the tension applied between the pulleys, will enable axial movement of the motor to its proper position in relation to the machine being driven thereby and such axial movement will be accomplished automatically by the torque of the drive belt which is applied to the drive pulley of the motor by any variation of the alignment of said driving and driven pulleys during operation of the machine unit by the said motor through said drive belt. Also that a motor mount of the type specified provides a construction in which the motor fast on its carrying bar is so mounted as to take full advantage of the rotative reaction of the motor as well as its weight to maintain the driving belt between the driving pulley on the motor and the machine being driven in properly tightened condition at all times during the driving operation by the motor of another machine and unit, and particularly said belt will be so maintained in such tightened condition as to cause any torque thereof produced by a movement of the driven machine to be transmitted to the motor drive-pulley and shaft and to result in an axial movement of the motor into proper alignment with the machine being driven thereby. Application on the belt of too much of the weight of the motor is undesirable and the weight of the motor is so adjusted that it is just over the center, while the balance of the tension is obtained from the rotative reaction of the motor as above indicated, when a load is applied to the driven pulley.

Suitable means is also provided for adjustment of the drive-belt, and, as shown, an elongated bolt-slot 11ᶜ is provided in the roller-mounting base member 11 and a suitable bolt 11ᵈ is adjustable in said slot to adjust the said base member in relation to the machine being driven by the motor. A groove 11ᵉ is also preferably provided in the bottom of the member 11 for belt-adjustment purposes.

Having described my invention, I claim:

1. A floating motor mount embodying, in combination, a motor having a conventional casing, drive-shaft and drive-pulley, a motor-carrying rod fixedly mounted on the motor-casing and extending parallel to said shaft, means including anti-friction devices for mounting said rod on said anti-friction devices to move axially and to carry the motor therewith, and a driving connection between said drive pulley on the motor shaft and a driven pulley on a machine unit to be driven by the motor, whereby tensioning of an adjusted drive-belt may be procured by the rotative reaction of the motor.

2. A floating motor mount embodying, in combination, a motor having a conventional casing, drive shaft and drive pulley, a motor-carrying rod or bar fixedly mounted on the motor casing and extending parallel to said shaft, mounting means for mounting said rod to move axially and to carry the motor therewith, and a driving connection between said drive pulley on the motor shaft and a driven pulley on a machine unit to be driven by the motor, said mounting means for said rod comprising a bracket and spaced anti-friction devices on which said rod is supported to have an axial movement.

3. A floating motor mount embodying, in combination, a motor having a conventional casing, drive shaft and drive pulley, a motor-carrying rod or bar fixedly mounted on the motor and extending parallel to said shaft, mounting means for mounting said rod to move axially thereof and to carry the motor therewith, a driving connection between said drive pulley on the motor shaft and a driven pulley on a machine unit to be driven by the motor, said mounting means for said motor-carrying rod comprising a bracket and spaced anti-friction devices composed of grooved pulleys, and said motor-carrying rod having a round surface to permit a tilting movement of the motor in cooperation with said sliding movement for the purpose of tensioning the connection between said drive and driven pulleys.

4. A floating motor mount embodying, in combination, a motor having a conventional casing, drive shaft and drive pulley, a motor-carrying rod or bar fixedly mounted on the motor casing and extending parallel to said shaft, mounting means for mounting said motor-carrying rod to move axially and to carry the motor therewith comprising a bracket and spaced grooved pulleys on which said motor-carrying rod is mounted to have an axial movement, said rod having a round surface to permit a tilting movement of the motor in cooperation with said axial movement for the purpose of tensioning the connection between said drive pulley and a driven pulley, said mounting means for said spaced pulleys including upright bearing blocks, spindles projecting from one face of each block on which said pulleys are mounted, and a driving connection between said drive pulley on the motor shaft and the driven pulley on a machine unit to be driven by said motor.

5. A floating motor mount embodying, in combination, a motor having a conventional casing, drive shaft and drive pulley, a motor-carrying rod or bar fixedly mounted on the motor casing and extending parallel to said shaft, mounting means for mounting said motor-carrying rod to move axially and to carry the motor therewith comprising a bracket and spaced grooved pulleys on which said motor-carrying rod is mounted to have an axial movement, said rod having a round surface to permit a tilting movement of the motor in cooperation with said axial movement for the purpose of tensioning the connection between said drive pulley and a driven pulley, said mounting means for said spaced pulleys including upright bearing blocks, spindles projecting from one face of each block on which said pulleys are mounted, and a driving connection between said drive pulley on the motor shaft and the driven pulley on a machine unit to be driven by said motor, said driving and driven pulleys having grooves and said driving connection comprising a tight belt, the members being so disposed and arranged that the torque of the drive belt, which is applied to the drive pulley of the motor by a variation of the alignment of the drive and driven pulleys during operation of the machine unit by the motor, will cause the motor, through the floating motor mount, to be automatically moved axially into proper position in relation to the machine being driven.

ABRAHAM POLLAK.

REFERENCES CITED

The following references are of record in the file of this patent:

UNITED STATES PATENTS

| Number | Name | Date |
|---|---|---|
| 379,116 | Leininger | Mar. 6, 1888 |
| 1,514,607 | Ellis | Nov. 11, 1924 |
| 2,237,555 | Haskell | Apr. 8, 1941 |